(12) United States Patent
Weber et al.

(10) Patent No.: US 8,303,037 B2
(45) Date of Patent: Nov. 6, 2012

(54) VEHICLE SEAT, IN PARTICULAR COMMERCIAL VEHICLE SEAT

(75) Inventors: Thomas Weber, Kaiserslautern (DE); Christof Nieroba, Kaiserslautern (DE); Thorsten Schweizer, Pirmasens (DE); Rüdiger Nissen, Freisen-Oberkirchen (DE); Thomas Gundall, Queidersbach (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 547 days.

(21) Appl. No.: 12/517,424

(22) PCT Filed: Feb. 18, 2008

(86) PCT No.: PCT/EP2008/001224
§ 371 (c)(1),
(2), (4) Date: Jun. 3, 2009

(87) PCT Pub. No.: WO2008/101644
PCT Pub. Date: Aug. 28, 2008

(65) Prior Publication Data
US 2010/0066146 A1 Mar. 18, 2010

(30) Foreign Application Priority Data
Feb. 21, 2007 (DE) .................. 10 2007 009 170

(51) Int. Cl.
*A47C 1/035* (2006.01)
*A47C 1/038* (2006.01)

(52) U.S. Cl. ............................. 297/344.15; 297/344.16

(58) Field of Classification Search ............. 297/344.15, 297/344.16; 248/421
See application file for complete search history.

(56) References Cited

U.S. PATENT DOCUMENTS

| 4,286,765 | A | * | 9/1981 | Delgleize et al. ........ 297/344.15 |
| 4,729,539 | A | * | 3/1988 | Nagata ...................... 297/344.15 |
| 5,676,424 | A | * | 10/1997 | Winkelhake ......... 297/344.15 X |
| 5,927,679 | A | * | 7/1999 | Hill ........................... 297/344.15 |
| 6,030,043 | A | | 2/2000 | Habedank |
| 6,276,650 | B1 | | 8/2001 | Kojima et al. |

FOREIGN PATENT DOCUMENTS

| DE | 2836005 | 2/1980 |
| DE | 32 43 747 A1 | 5/1984 |
| DE | 44 08 219 | 9/1995 |
| DE | 19828217 | 7/1999 |
| DE | 19911786 | 9/2000 |
| FR | 2 433 433 | 4/1980 |
| GB | 749732 A | 5/1956 |
| JP | 56 131432 | 10/1981 |
| JP | 1136030 | 9/1989 |
| JP | 9226427 | 9/1997 |
| RU | 27365 U1 | 1/2003 |
| WO | WO 2006/032975 | 3/2006 |

* cited by examiner

*Primary Examiner* — Anthony D Barfield
(74) *Attorney, Agent, or Firm* — McGlew and Tuttle, P.C.

(57) ABSTRACT

A vehicle seat (1), in particular a commercial vehicle seat, is provided with a scissor-type stand (3) with a seat frame (10) that is articulated thereto by a pivoting axis (B), the seat frame being able to incline in relation to the scissor-type stand (3), and a back rest (20) that is attached to the seat frame (10). The seat frame (10) is articulated directly to the scissor-type stand (3) and is connected in an articulated manner to the scissor-type frame (3) by at least one three-hinged element.

12 Claims, 3 Drawing Sheets

VEHICLE SEAT, IN PARTICULAR COMMERCIAL VEHICLE SEAT

CROSS REFERENCE TO RELATED APPLICATIONS

This application is a United States National Phase application of International Application PCT/PCT/EP2008/001224 and claims the benefit of priority under 35 U.S.C. §119 of German Patent Application DE 10 2007 009 170.4 filed Feb. 21, 2007, the entire contents of which are incorporated herein by reference.

FIELD OF THE INVENTION

The invention relates to a vehicle seat, in particular commercial vehicle seat, with a scissors-type stand, a seat frame which is coupled thereto by means of a pivot axis and which can be adjusted in its inclination relative to the scissors-type stand, and a backrest which is attached to the seat frame or to the scissors-type stand.

BACKGROUND OF THE INVENTION

Known vehicle seats with a scissors-type stand are generally used for commercial vehicles. While, in a simple embodiment, the seat frame is part of the scissors-type stand or is connected fixedly thereto, in order to increase the seat comfort the seat frame can be adjusted in inclination relative to the scissors-type stand, for example by the seat frame being coupled to the scissors-type stand and a linear adjuster or a gearing pivoting the seat frame relative to the scissors-type stand. A vehicle seat of the type mentioned at the beginning which is improved in such a manner is known from DE 32 43 747 C2.

SUMMARY OF THE INVENTION

The invention is based on the object of further improving a vehicle seat of the type mentioned at the beginning.

According to the invention, a vehicle seat, in particular commercial vehicle seat, is provided with a scissors-type stand, a seat frame which is coupled thereto by means of a pivot axis and which can be adjusted in its inclination relative to the scissors-type stand, and a backrest which is attached to the seat frame or to the scissors-type stand. The seat frame is coupled directly to the scissors-type stand and is connected in an articulated manner to the scissors-type stand by means of at least one triple-jointed element.

Owing to the fact that the seat frame is coupled directly to the scissors-type stand and is connected in an articulated manner to the scissors-type stand by means of at least one triple jointed element, a simply constructed inclination adjustment which takes place by driving the triple-jointed element is provided. The drive can take place using conventional driving devices, preferably an inclination-adjusting fitting which is provided in the triple-jointed element next to a link which is connected in an articulated manner to the inclination-adjusting fitting. The inclination-adjusting fitting may be a latching fitting or a geared fitting as is known per se for adjusting the inclination of the backrest. This reduces the costs. In this case, embodiments with disk-shaped units and embodiments with radially protruding fastening tabs are possible.

A first joint which is aligned with an inclination-adjusting axis defined by the inclination-adjusting fitting, and a further link can be provided on the vehicle seat side which is opposite the inclination-adjusting fitting. This reduces the number of components and also the costs. The inclination-adjusting axis and the two joints of the link preferably define the triple-jointed element. The geometry of the triple-jointed element is preferably optimized with regard to the moments which occur. Thus, for example, an axial offset between the pivoting planes of the joints, for example between the inclination-adjusting fitting or lever and the link, if, for example, a crosspiece is provided on both vehicle seat sides between inclination-adjusting fitting and lever, has the advantage that no bending moments are exerted on such a crosspiece.

The scissors-type stand preferably has a first catch element and the seat frame preferably has a second catch element, which catch elements normally do not interact and, in the event of a crash or misuse, approach each other because of a torque caused to act on the seat frame by means of the backrest, and then interact, in particular come into contact with each other, creating a further path for the force flux, and the forces are not only conducted via the deflecting point of the seat frame on the scissors-type stand and via the linear adjuster or the gearing, but also parallel thereto via the catch elements. There is therefore a better transmission of load from the seat frame to the scissors-type stand and/or the substructure, which permits the components which lie in the force flux parallel to the catch elements to be smaller and, as a result, overall reduces the production costs and the weight. This advantage is preferably reinforced in that the catch elements increase the supporting length by the catch elements being provided at a distance from the coupling point, for example at the end of the seat frame, if the latter is coupled centrally. In embodiments which are simple to produce, the catch elements are designed as angled stops, teeth, hooks, bolts, edges of openings or the like.

The invention is explained below in more detail with reference to two exemplary embodiments which are illustrated in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
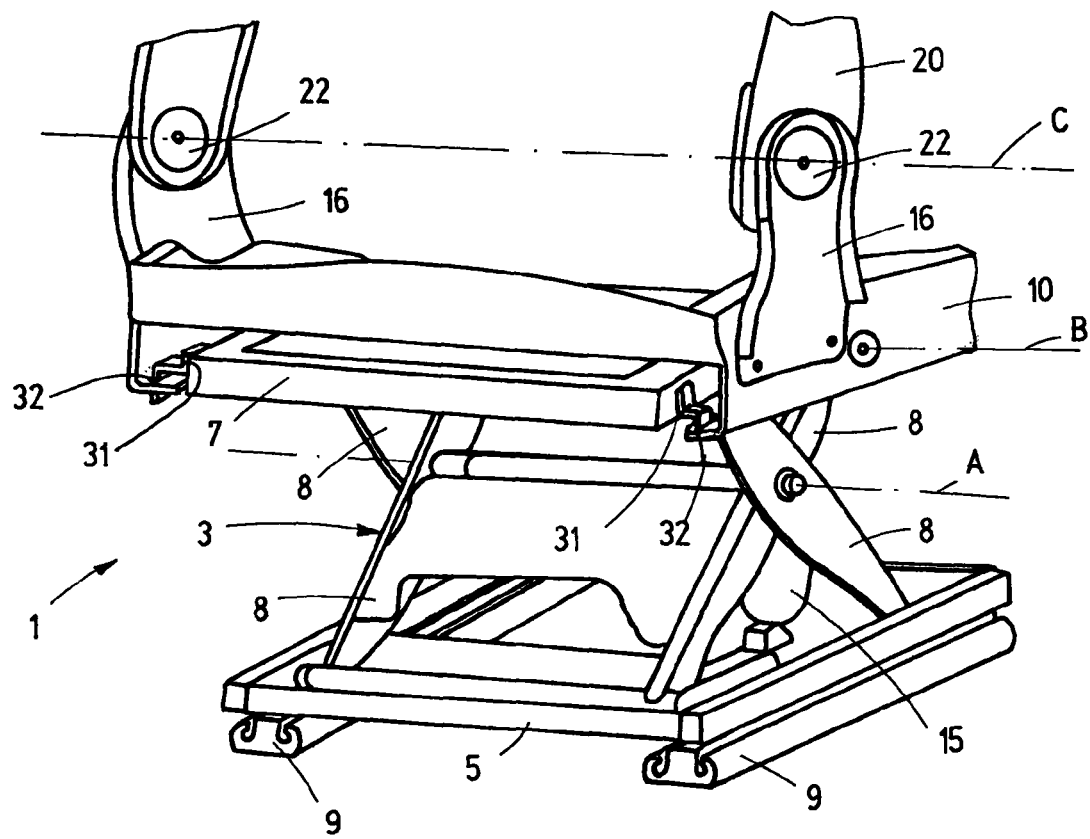
FIG. 1 is a perspective partial view, which is common to both exemplary embodiments, without the upholstery.
Figure 2:
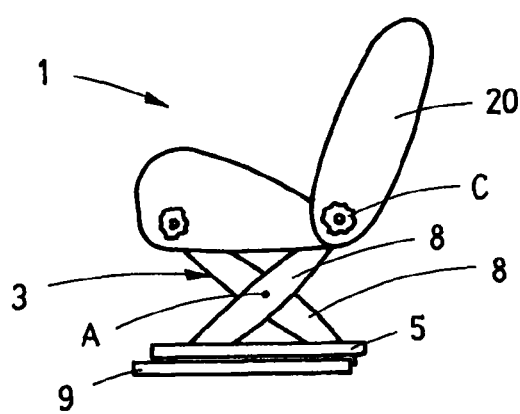
FIG. 2 is a schematic side view which is common to both exemplary embodiments.
Figure 3:
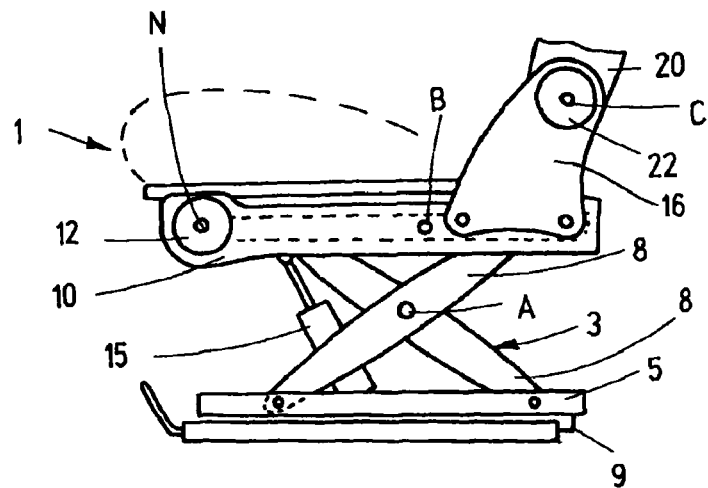
FIG. 3 is a side view, which is common to both exemplary embodiments, in a normal situation at an angle of inclination of 0° between the seat frame and scissors-type stand.
Figure 4:
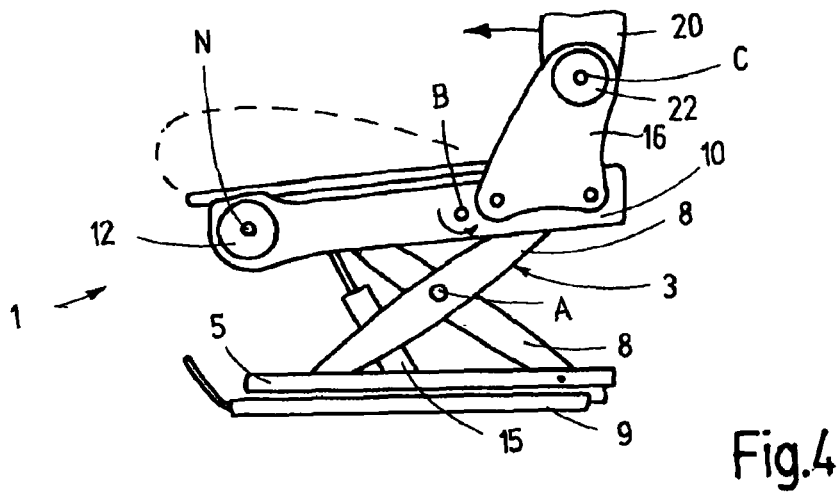
FIG. 4 is a side view corresponding to FIG. 3 in the event of a crash.
Figure 5:
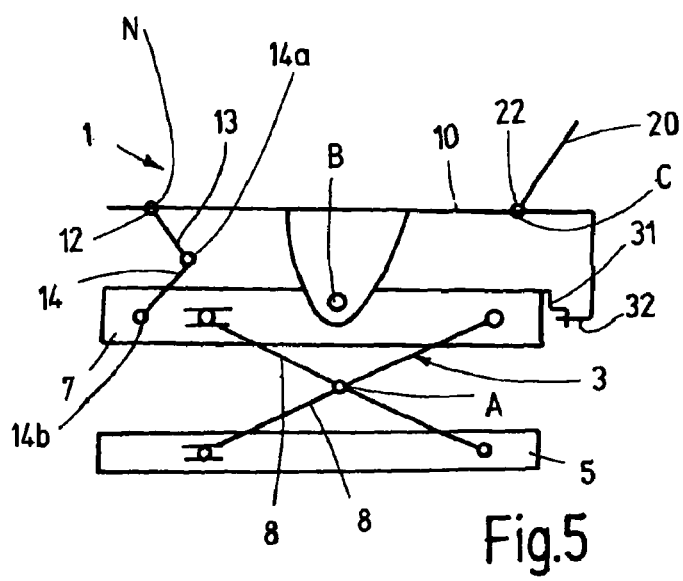
FIG. 5 is a schematic illustration, which is common to both exemplary embodiments, of all of the joints.
Figure 6:
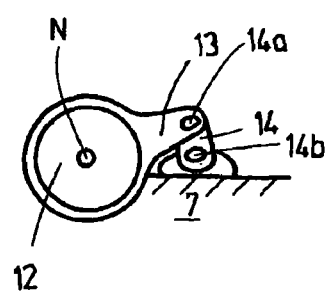
FIG. 6 is a schematic illustration of the triple-jointed element.
Figure 7:
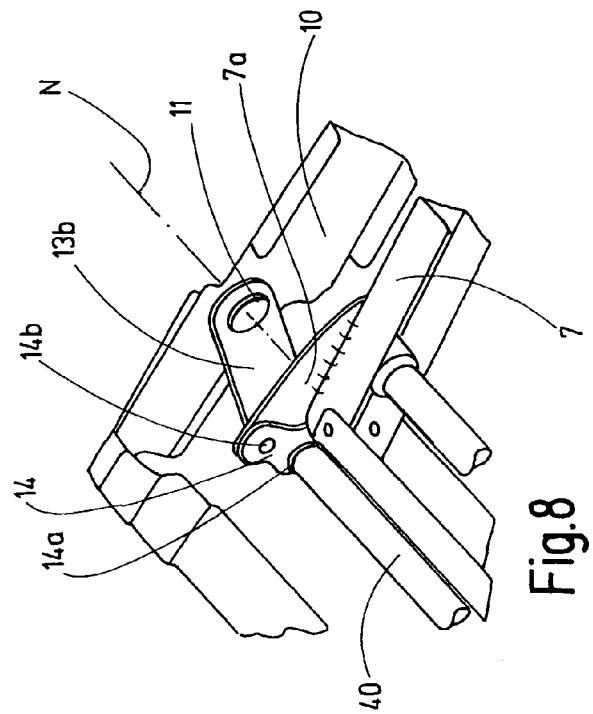
FIG. 7 is a perspective partial view of the first exemplary embodiment on the vehicle seat side with the inclination-adjusting fitting.
Figure 8:
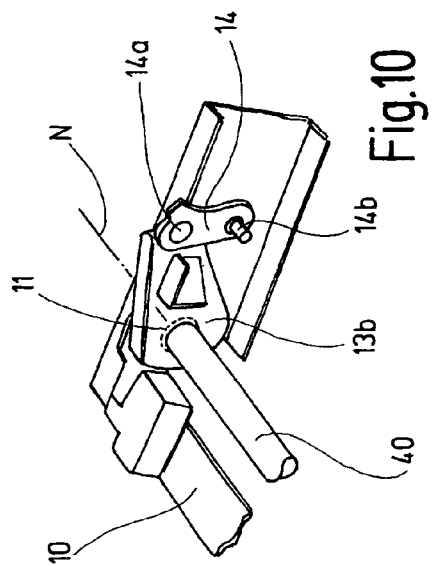
FIG. 8 is a perspective partial view of the first exemplary embodiment on the opposite vehicle seat side.

Referring to the drawings in particular, a vehicle seat 1 for a commercial vehicle or another motor vehicle has a scissors-type stand 3 which comprises a bottom frame 5, a top frame 7 arranged thereabove and a respective pair of crossed rockers 8 on both sides. A scissors axis A connects the two crossing points and at the same time defines the axis about which the rockers 8 can pivot relative to each other. The rockers 8 are each coupled at their rear end to the bottom frame 5 and to the top frame 7 and each have, at their front end, rotatable rollers by means of which they are guided movably in the longitudinal direction of the seat in or on the top frame 7 and bottom frame 5. By means of said movement of the rockers 8, the top frame 7 is adjusted in height over the bottom frame 5. In the present case, the scissors-type stand 3 can be displaced in the longitudinal direction of the seat by means of seat rails 9, thus enabling the vehicle seat 1 to be adjusted longitudinally, i.e. enabling the seat longitudinal position thereof to be adjusted.

The vehicle seat 1 furthermore has a seat frame 10 which is coupled on both sides to the top frame 7—pivotably relative to the scissors-type stand 3 about a horizontal seat-frame pivot axis B. In the present case, said seat-frame pivot axis B—as seen in the longitudinal direction of the seat—is arranged somewhat behind the center of the seat frame 10. At the front end of the seat frame 10, a first joint 11 is provided on one vehicle seat side and, on the opposite vehicle seat side, an inclination-adjusting fitting 12 is provided in alignment with said joint. As an alternative, inclination-adjusting fittings 12 of the same type are provided on both vehicle seat sides. The inclination-adjusting fitting 12 has two fitting parts 12a and 12b which are rotatable relative to each other, thereby defining an inclination-adjusting axis N (which is in alignment with the first joint 11). The two fitting parts 12a and 12b can be locked to each other (latching fitting), as described, for example, in WO 00/44582 A1, the disclosure content of which in this regard is expressly incorporated, or are connected to each other in a geared manner (geared fitting), for example by means of a self-locking eccentric epicyclic gearing, as described, for example, in DE 44 36 101 A1, the disclosure content of which in this regard is expressly incorporated.

Inclination-adjusting fittings 12 of this type are known per se for adjusting the inclination of the backrest.

The first fitting part 12a of the inclination-adjusting fitting 12 is connected fixedly to the seat frame 10 while a first lever 13 is fastened to the second fitting part 12b (or alternatively is integrally formed thereon). In a manner described more precisely further on, a link 14 is connected in an articulated manner to the first lever 13, said link having a second joint 14a for this purpose at its one end. The link 14 is coupled at its other end to the top frame 7 by means of a third joint 14b. As a result, the inclination-adjusting axis N and the link 14 with its two coupling points 14a and 14b define a triple-jointed element.

A second lever 13b is provided on the other vehicle seat side, said lever, if, as in the present case, a first joint 11 which is aligned with the inclination-adjusting fitting 12 is provided, corresponding in its dimensions in the circumferential and radial direction (with respect to the first joint 11) to the second fitting part 12b together with the first lever 13. In the alternative embodiment with a further inclination-adjusting fitting 12 on the other vehicle seat side, the second lever 13b is designed identically to or in a mirror-inverted manner to the first lever 13. A further link 14 of identical construction, i.e. identical or mirror-inverted design, is coupled to the second lever 13b by means of the second joint 14a and to the top frame 7 by means of the third joint 14b. In all cases, a triple-jointed element is therefore provided on both sides between the seat frame 10 and top frame 7.

The inclination of the seat frame 10 relative to the top frame 7 and therefore relative to the scissors-type stand 3 can be adjusted by means of the inclination-adjusting fitting or the inclination-adjusting fittings 12 and the triple jointed elements. The inclination-adjusting fitting or the inclination-adjusting fittings 12 is or are driven in a manner known per se manually or by motor. The seat frame 10 bears a seat shell with a seat cushion in a manner known per se.

By means of a spring 15, preferably a gas-filled spring, and preferably a damper, the scissors-type stand 3 is a rockable system which increases the seat comfort.

At the rear end, a respective backrest adaptor 16 is fastened on both sides to the seat frame 10 (or alternatively to the scissors-type stand 3, in particular to the top frame 7 of the same). A backrest 20 is attached pivotably about a backrest pivot axis C to the backrest adaptors 16 by means of backrest fittings 22 provided on both sides. In a modified embodiment, the backrest 20 can be attached pivotably about the backrest pivot axis C directly to the seat frame 10 (or alternatively to the scissors-type stand 3, in particular to the top frame 7 of the same) by means of the backrest fittings 22. The backrest fittings 22 are driven manually or by motor. In a further modification, a backrest fitting 22 is provided only on one vehicle seat side and a joint is provided on the other vehicle seat side.

Like the inclination-adjusting fittings 12, the backrest fittings 22 can be designed as latching fittings or geared fittings, preferably with a self-locking eccentric epicyclic gearing and, in terms of structure, can preferably form a disk-shaped unit. The backrest 20 can be pivoted relative to the seat frame 10 by means of the backrest fittings 22 and can be adjusted in its inclination. The backrest 20 is upholstered in a manner known per se.

A first catch element 31 is provided at the rear end of the top frame 7—in the present case in each case on both vehicle seat sides—while a respective second catch element 32 is provided at the rear end of the seat frame 10 for interaction with each first catch element 31 provided. The catch elements 31 and 32 are spaced apart from the coupling point of the seat frame 10 to the top frame 7. The two catch elements 31 and 32 on each vehicle seat side are arranged in such a manner that they normally do not interact. However, meshing or the like is possible. In the event of a head-on crash or severe misuse, when a force acts on the backrest 20 in the forward direction, a forwardly acting torque in the sense of a pivoting movement is caused by means of the backrest 20 to act on the seat frame 10, which is attached to the backrest 20, about the seat-frame pivot axis B. As a result, the seat frame 10, which is coupled to the top frame 7 at the seat-frame pivot axis B, moves downward in direction at its front end and upward at its rear end. As a result, the second catch element 32 draws closer to the first catch element 31 and comes—in the present case at approximately 4° downward in relation to the horizontal—into contact with the first catch element 31, i.e., in the event of a crash or the like, the two catch elements 31 and 32 interact. By means of said interaction and the further path for the force flux, better load transmission from the seat frame 10 to the scissors-type stand 3 takes place.

To this extent, the two exemplary embodiments coincide.

As already mentioned, inclination-adjusting fittings 12 as known for the adjustment of the inclination of the backrest are used for the triple-jointed elements. Such an inclination-adjusting fitting 12 can therefore have integrally formed fastening tabs protruding radially on the fitting parts 12a and 12b (and retaining clamps to axially hold together the fitting parts 12a and 12b), this being described as the first exemplary embodiment, or, in terms of structure, can form a disk-shaped unit (and have a clasping ring for the axial holding together), this being described as the second exemplary embodiment. In order to simplify the logistics, in each exemplary embodiment the backrest fittings 22 and the inclination-adjusting fittings 12 are preferably of the same type.

In the first exemplary embodiment, on the one vehicle seat side a crosspiece 40 is fastened (if appropriate by means of a further adaptor), preferably welded, to the first lever 13 which is preferably formed by the fastening tabs on the second fitting part 12b and the associated retaining clamp. The crosspiece 40, for example a tube, is arranged parallel to the seat-frame pivot axis B and runs to the other vehicle seat side. The link 14 is coupled to the crosspiece 40 by means of the second joint 14a in a manner axially offset with respect to the first lever 13. In this case, the axis of the inclination-adjusting fitting 12, the second joint 14a and the crosspiece 40 mark the corners of a triangle, the geometry of which is optimized with regard to the driving moments in the triple-jointed element.

The second lever 13b is provided on the other vehicle seat side which has the first joint 11, said lever being coupled to the seat frame 10 by means of the first joint 11 and likewise being fastened, preferably welded, to the crosspiece 40. The first lever 13, the second lever 13b and the crosspiece 40 therefore form a fixed constructional unit. Also on the vehicle seat side which has the first joint 11, the link 14 is coupled to the crosspiece 40, i.e. to said constructional unit, by means of the second joint 14a in a manner offset axially with respect to the second lever 13b. The two links 14 are coupled by means of a respective third joint 14b to the top frame 7, or more precisely to a—preferably slightly obliquely protruding—top-frame adaptor 7a of the top frame 7.

The axial offset between the first lever 13 or second lever 13b and the link 14, i.e. between the respective pivoting planes, along the crosspiece 40 (i.e. axially with respect to the inclination-adjusting axis N), assists in optimizing the geometry of the triple-jointed element, said offset being depicted as an axial offset between the fitting 12 or the first joint 11 and the second joint 14a. Said axial offset has the advantage that bending moments are not exerted on the crosspiece 40.

Figure 9:
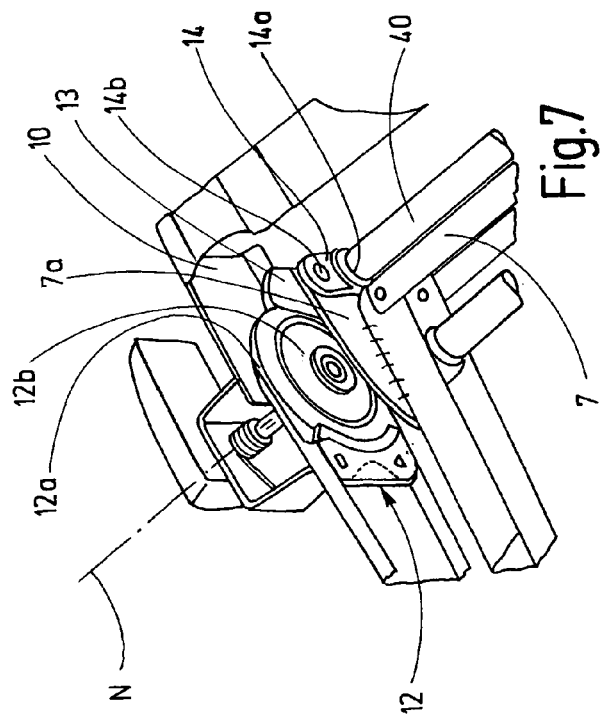
FIG. 9 is a perspective partial view of the second exemplary embodiment on the vehicle seat side with the inclination-adjusting fitting.
Figure 10:
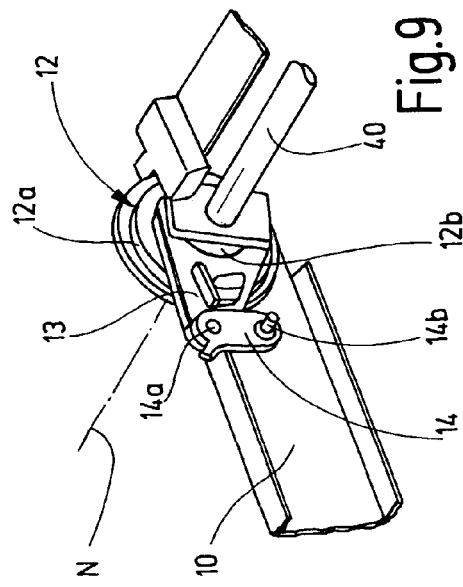
FIG. 10 is a perspective partial view of the second exemplary embodiment on the opposite vehicle seat side.

In the second exemplary embodiment, on the one vehicle seat side the first lever 13 is fastened to the second fitting part 12b, for example at axially protruding back studs. The crosspiece 40—in alignment with the inclination-adjusting axis N—is fastened to the second fitting part 12b, for example to the axially protruding back studs by means of an adaptor, and if appropriate additionally (or alternatively) to the first lever 13. On the other side, the crosspiece 40 is mounted rotatably in the seat frame 10 by means of the first joint 11. The second lever 13b is fastened to the crosspiece 40 and corresponds in its dimensions and substantially in its configuration to the first lever 13. The second fitting part 12b, the first lever 13, the second lever 13b and the crosspiece 40 therefore form a fixed constructional unit. The links 14 are in each case coupled directly to the first lever 13 or second lever 13b by means of the second joint 14a while they are coupled to the top frame 7 (not illustrated in FIGS. 9 and 10) by means of the third joint 14b.

While specific embodiments of the invention have been described in detail to illustrate the application of the principles of the invention, it will be understood that the invention may be embodied otherwise without departing from such principles.

| List of designations | |
|---|---|
| 1 | Vehicle seat |
| 3 | Scissors-type stand |
| 5 | Bottom frame |
| 7 | Top frame |
| 7a | Top-frame adaptor |
| 8 | Rocker |
| 9 | Seat rail |
| 10 | Seat frame |
| 11 | First joint |
| 12 | Inclination-adjusting fitting |
| 12a | First fitting part |
| 12b | Second fitting part |
| 13 | First lever |
| 13b | Second lever |
| 14 | Link |
| 14a | Second joint |
| 14b | Third joint |
| 15 | Spring |
| 16 | Backrest adaptor |
| 20 | Backrest |
| 22 | Backrest fitting |
| 31 | First catch element |
| 32 | Second catch element |
| 40 | Crosspiece |
| A | Scissors axis |
| B | Seat-frame pivot axis |
| C | Backrest pivot axis |
| N | Inclination-adjusting axis |

The invention claimed is:

1. A vehicle seat comprising:
a scissors-stand including a bottom frame, a top frame arranged above the bottom frame and a pair of crossed rockers for adjusting the top frame in height relative to the bottom frame;
a seat frame;
a pivot with a pivot axis, the seat frame being connected to the scissors-stand by the pivot for seat frame inclination relative to the scissors-stand about the pivot axis;
a backrest attached to the seat frame or to the scissors-stand; and
a triple-jointed element connecting the seat frame in an articulated manner to the scissors-stand, said triple-jointed element comprising an inclination-adjusting fitting, said inclination-adjusting fitting comprising a first fitting part and a second fitting part, said first fitting part being arranged at said seat part, said first fitting part and said second fitting part being rotatable relative to one another about a rotational axis, said rotational axis being substantially perpendicular to a longitudinal direction of said seat frame.

2. The vehicle seat as claimed in claim 1, wherein the triple jointed element comprises a link, said inclination-adjusting fitting comprising an inclination-adjusting axis, said inclination-adjusting fitting acting between one of the seat frame and the scissors-stand and said link.

3. The vehicle seat as claimed in claim 2, further comprising another side triple-jointed element provided on another side of the vehicle seat from said triple-jointed element, said another side triple-jointed element comprising a first joint aligned with the inclination-adjusting axis and provided on the vehicle seat side which lies opposite the inclination-adjusting fitting.

4. The vehicle seat as claimed in claim 2, wherein said triple-jointed element includes a first lever fastened to said second fitting part of said inclination-adjusting fitting, said link being connected to the first lever in an articulated manner by means of a second joint with said second joint coupled directly to said first lever, with respect to the inclination-adjusting axis or arranged axially offset with respect to said first lever.

5. The vehicle seat as claimed in claim 4, wherein a second lever is coupled by means of said first joint to said seat frame and said second lever is articulated to a further link by a further second joint, the further second joint being coupled directly to the second lever, with respect to the inclination-adjusting axis or being arranged axially offset with respect to the second lever.

6. The vehicle seat as claimed in claim 5, further comprising a crosspiece provided between the second fitting part of the inclination-adjusting fitting or the first lever and the second lever, said crosspiece being arranged parallel to the inclination-adjusting axis or in alignment therewith, and being connected fixedly to said second fitting part, said first lever and said second lever and being provided with the axially offset second joint.

7. The vehicle seat as claimed in claim 4, wherein the link is coupled to the scissors-stand or to the seat frame by means of a third joint.

8. The vehicle seat as claimed in claim 1, further comprising at least one backrest fitting wherein the backrest is attached pivotably by means of the at least one backrest fitting to the seat frame or to the scissors-stand or to backrest adaptors fastened to the seat frame or to the scissors-stand.

9. The vehicle seat as claimed in claim 1, wherein said first fitting part engages an inner surface of said seat frame, said second fitting part being connected to said top frame.

10. A vehicle seat comprising:
a scissors-type stand;
a seat frame which is coupled to the scissors-type stand at a pivot axis and which can be adjusted in inclination relative to the scissors-type stand;
a backrest which is attached to the seat frame or to the scissors-type stand, the seat frame being coupled directly to the scissors-type stand; and
at least one triple-jointed element connecting the seat frame in an articulated manner to the scissors-type stand, wherein at least one inclination-adjusting fitting is provided in the triple-jointed element, said at least one inclination-adjusting fitting being arranged at said seat frame, said inclination-adjusting fitting defining an inclination-adjusting axis and said inclination-adjusting fitting being effective between the seat frame or the scissors-type stand and a link of the triple-jointed element, wherein a first lever is fastened to a fitting part of the inclination-adjusting fitting, the link being connected to the first lever in an articulated manner by means of a second joint, with the second joint coupled directly to the first lever, with respect to the inclination-adjusting axis, or arranged axially offset with respect to the first lever, said link being coupled to the scissors-type stand or to the seat frame by means of a third joint, said inclination-adjusting axis and said second joint and said third joint of the link defining the triple-jointed element, wherein at least a portion of said at least one inclination-adjusting fitting engages an inner surface of said seat frame, said inclination-adjusting fitting being rotatable about said inclination-adjusting axis.

11. A vehicle seat comprising:
a scissors-type stand;
a seat frame which is coupled to the scissors-type stand at a pivot axis and which can be adjusted in its inclination relative to the scissors-type stand;
a backrest which is attached to the seat frame or to the scissors-type stand, the seat frame being coupled directly to the scissors-type stand; and
at least one triple-jointed element connecting the seat frame in an articulated manner to the scissors-type stand, wherein at least one inclination-adjusting fitting is provided in the triple-jointed element, said at least one inclination-adjusting fitting being arranged at said seat frame, said inclination-adjusting fitting defining an inclination-adjusting axis and said inclination-adjusting fitting being effective between the seat frame or the scissors-type stand and a link of the triple-jointed element, wherein a first lever is fastened to a fitting part of the inclination-adjusting fitting, the link being connected to the first lever in an articulated manner by means of a second joint, with the second joint coupled directly to the first lever, with respect to the inclination-adjusting axis, or arranged axially offset with respect to the first lever, said link being coupled to the scissors-type stand or to the seat frame by means of a third joint, said inclination-adjusting axis and said second joint and said third joint of the link defining the triple-jointed element, wherein said at least one inclination-adjusting fitting comprises another fitting part, said fitting part and said another fitting part being rotatable relative to one another, said fitting part engaging an inner surface of said seat frame, said scissors-type stand including a bottom frame and a top frame arranged above the bottom frame, said another fitting part being connected to said top frame.

12. A vehicle seat comprising:
a scissors-stand including a bottom frame, a top frame arranged above the bottom frame and a pair of crossed rockers for adjusting the top frame in height relative to the bottom frame;
a seat frame comprising an inner surface;
a pivot with a pivot axis, the seat frame being connected to the scissors-stand by the pivot for seat frame inclination relative to the scissors-stand about the pivot axis;
a backrest attached to the seat frame or to the scissors-stand; and
a triple-jointed element connecting the seat frame in an articulated manner to the scissors-stand, said triple-jointed element comprising an inclination-adjusting fitting, said inclination-adjusting fitting comprising a first fitting part and a second fitting part, said first fitting part engaging said seat frame, said first fitting part and said second fitting part being rotatable relative to one another about an axis substantially perpendicular to a longitudinal direction of said seat frame, at least a portion of said first fitting part engaging said inner surface, at least a portion of said first fitting part engaging at least a portion of said second fitting part.

* * * * *